US010663974B2

(12) United States Patent
Suk et al.

(10) Patent No.: US 10,663,974 B2
(45) Date of Patent: May 26, 2020

(54) OBJECT RECOGNITION DEVICE, AUTONOMOUS DRIVING SYSTEM INCLUDING THE SAME, AND OBJECT RECOGNITION METHOD USING THE OBJECT RECOGNITION DEVICE

(71) Applicant: ELECTRONICS AND TELECOMMUNICATIONS RESEARCH INSTITUTE, Daejeon (KR)

(72) Inventors: Jung Hee Suk, Daejeon (KR); Yi-Gyeong Kim, Daejeon (KR); Chun-Gi Lyuh, Daejeon (KR); Young-Deuk Jeon, Daejeon (KR); Min-Hyung Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 282 days.

(21) Appl. No.: 15/804,992

(22) Filed: Nov. 6, 2017

(65) Prior Publication Data

US 2018/0143646 A1 May 24, 2018

(30) Foreign Application Priority Data

Nov. 23, 2016 (KR) .................. 10-2016-0156767
May 2, 2017 (KR) .................. 10-2017-0056538

(51) Int. Cl.
*G01C 22/00* (2006.01)
*G05D 1/02* (2020.01)
(Continued)

(52) U.S. Cl.
CPC ........... *G05D 1/0253* (2013.01); *B60W 30/00* (2013.01); *G05D 1/0088* (2013.01);
(Continued)

(58) Field of Classification Search
CPC .. G05D 1/0253; G05D 1/0223; G05D 1/0088; G05D 2201/0212; B60W 30/00;
(Continued)

(56) References Cited

U.S. PATENT DOCUMENTS

| 9,275,458 B2* | 3/2016 | Oh ............................ G06T 7/80 |
| 9,352,690 B2 | 5/2016 | Choi et al. |
| 2011/0044545 A1* | 2/2011 | Jessen .................. G06K 9/6203 382/190 |
| 2012/0050074 A1* | 3/2012 | Bechtel ..................... B60R 1/04 340/988 |
| 2013/0292517 A1* | 11/2013 | Briskman ................ B64G 1/24 244/158.8 |

(Continued)

FOREIGN PATENT DOCUMENTS

| KR | 10-2010-0134085 A | 12/2010 |
| KR | 10-2012-0131450 A | 12/2012 |
| KR | 10-2014-0065520 A | 5/2014 |

*Primary Examiner* — Shardul D Patel

(57) ABSTRACT

Provided are an object recognition device, an autonomous driving system including the same, and an object recognition method using the object recognition device. The object recognition device includes an object frame information generation unit, a frame analysis unit, an object priority calculator, a frame complexity calculator, and a mode control unit. The object frame information generation unit generates object frame information based on a mode control signal. The frame analysis unit generates object tracking information based on object frame information. The object priority calculator generates based on object tracking information. The frame complexity calculator generates a frame complexity based on object tracking information. The mode control unit generates a mode control signal for adjusting an object recognition range and a calculation amount of the object frame information generation unit based on the priority information, the frame complexity, and the resource occupation state.

20 Claims, 13 Drawing Sheets

(51) Int. Cl.
*G06K 9/00* (2006.01)
*G05D 1/00* (2006.01)
*B60W 30/00* (2006.01)
*G06K 9/46* (2006.01)

(52) U.S. Cl.
CPC ....... *G05D 1/0223* (2013.01); *G06K 9/00805* (2013.01); *G06K 9/00993* (2013.01); *G05D 2201/0212* (2013.01); *G06K 9/46* (2013.01); *G06K 2209/21* (2013.01)

(58) Field of Classification Search
CPC .. G06K 9/00993; G06K 9/00805; G06K 9/46; G06K 2209/21
USPC .......................................................... 701/28
See application file for complete search history.

(56) References Cited

U.S. PATENT DOCUMENTS

| | | | |
|---|---|---|---|
| 2015/0378361 A1* | 12/2015 | Walker | G05D 1/0206 701/21 |
| 2017/0001637 A1* | 1/2017 | Nguyen Van | B60W 50/0225 |
| 2017/0132477 A1* | 5/2017 | Kim | G06K 9/325 |
| 2017/0227640 A1* | 8/2017 | Nomura | B60R 21/00 |
| 2017/0329332 A1* | 11/2017 | Pilarski | B60W 50/0097 |
| 2018/0067495 A1* | 3/2018 | Oder | B60W 10/184 |
| 2018/0068206 A1* | 3/2018 | Pollach | G06K 9/00791 |
| 2018/0154825 A1* | 6/2018 | Tanaka | G06T 1/00 |
| 2018/0194344 A1* | 7/2018 | Wang | G05D 1/0221 |

* cited by examiner

OBJECT RECOGNITION DEVICE, AUTONOMOUS DRIVING SYSTEM INCLUDING THE SAME, AND OBJECT RECOGNITION METHOD USING THE OBJECT RECOGNITION DEVICE

CROSS-REFERENCE TO RELATED APPLICATIONS

This U.S. non-provisional patent application claims priority under 35 U.S.C. § 119 of Korean Patent Application Nos. 10-2016-0156767, filed on Nov. 23, 2016, and 10-2017-0056538, filed on May 2, 2017, the entire contents of which are hereby incorporated by reference.

BACKGROUND

The present disclosure herein relates to signal processing for object recognition, and more particularly, to an object recognition device, an autonomous driving system including the same, and an object recognition method using the object recognition device.

Various electronic devices are provided in a vehicle to ensure the convenience of a user who uses the vehicle. In particular, autonomous driving technology that is able to recognize objects in the periphery and reach the destination while preventing collision with the objects is emerging. In order to ensure the stability of autonomous driving, it is important to accurately recognize objects such as other vehicles or pedestrians. In addition, it is required to maintain a predetermined interval from the objects and to select an optimal driving path. In order to select the optimized driving path, the object information perceived in various ways is processed.

Vehicles under autonomous driving may encounter various objects. In particular, the driving of the commute, the driving of the intersection, or the driving of the alleyway require precise control of a vehicle based on the number of objects or the complexity of a driving path. In such a complex environment, the autonomous driving system may face an overload condition.

An autonomous driving system may cause a system halt or failure in an overload condition. Sudden system halt or errors may lead to road congestion, and may even lead to traffic accidents. Therefore, a methodology for securing the stability of an autonomous driving system in complex surroundings is required. In addition, there is a demand for an autonomous driving system that is able to speed up the processing speed of perceived object information and quickly respond to surrounding situations.

SUMMARY

The present disclosure provides an object recognition device capable of improving the instability of autonomous driving in an overload state, an autonomous driving system including the same, and an object recognition method using the object recognition device.

An embodiment of the inventive concept provides an object recognition device including an object frame information generation unit, a frame analysis unit, a driving path analysis unit, an object priority calculator, a frame complexity calculator, a resource detector, a calculation mode indicator calculator, and a mode control unit.

The object frame information generation unit recognizes at least one object based on the mode control signal and generates object frame information. The frame analysis unit receives the object frame information. The frame analysis unit generates the object tracking information by calculating the prediction position or prediction speed of the object for the next frame. The driving path analysis unit generates driving path information for the next frame based on the object tracking information.

The object priority calculator calculates the probability of collision between the object and the object recognition device based on the object tracking information and the driving path information. The object priority calculator generates priority information for the object based on the possibility of collision.

The frame complexity calculator calculates the object complexity based on the object tracking information. The frame complexity calculator calculates the path complexity based on the driving path information. The frame complexity calculator calculates the frame complexity based on the object complexity and the path complexity. The frame complexity calculator calculates the frame complexity based on the number and distribution of objects.

The calculation mode indicator calculator generates the calculation mode indicator based on the frame complexity and the resource occupation state. The calculation mode indicator calculator determines the absolute value of the calculation mode indicator based on the frame complexity and determines the polarity of the calculation mode indicator based on the resource occupation state.

The mode control unit generates a mode control signal for adjusting the object recognition range and the calculation amount of the object frame information generation unit based on the priority information, the frame complexity, and the resource occupation state. The mode control unit provides a high calculation mode control signal, a low calculation mode control signal, or a skip mode control signal to the object frame information generation unit based on the calculation mode indicator.

In an embodiment of the inventive concept, an autonomous driving system includes a sensor unit, an object recognition device, a vehicle control device, a processor, and a memory. The sensor unit senses the periphery and generates sensing information. An object recognition device includes an object frame information generation unit, a frame analysis unit, a driving path analysis unit, an object priority calculator, a frame complexity calculator, a resource detector, a calculation mode indicator calculator, and a mode control unit. The object recognition device adjusts the object recognition range and the calculation amount of the object frame information generation unit based on the resource occupation state of the processor or the memory and the frame complexity. The vehicle control device controls the steering angle and speed of the vehicle based on the driving path information.

In an embodiment of the inventive concept, an object recognition method includes generating object frame information, generating object tracking information, generating driving path information, generating priority information, calculating a frame complexity, detecting a resource occupation state, and changing the object recognition range by controlling the calculation of the object frame information.

For example, in the changing of the object recognition range, when the resource occupation state is a full state, the object frame information having the priority information of the lowest ranking among the objects where the object frame information is generated in the high calculation mode in the previous frame is generated in the low calculation mode. In addition, the number of object frame information generated in the low calculation mode is adjusted based on the frame complexity.

For example, in the changing of the object recognition range, when the resource occupation state is a full state and plurality of object tracking information are all generated in the low calculation mode in the previous frame, the generation of the object frame information having the priority information of the lowest priority is blocked. In addition, the number of blocking the generation of object frame information is adjusted based on the frame complexity.

For example, in the changing of the object recognition range, when the resource occupation state is a not full state, the object frame information having the priority information of the highest ranking among the objects where the generation of the object frame information is blocked in the skip mode in the previous frame is generated in the low calculation mode. In addition, the number of object frame information generated in the low calculation mode is adjusted based on the frame complexity.

For example, in the changing of the object recognition range, when the resource occupation state is a not full state, the object frame information having the priority information among the objects where the object frame information is generated in the low calculation mode in the previous frame is generated in the high calculation mode. In addition, the number of object frame information generated in the high calculation mode is adjusted based on the frame complexity.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

In the following, embodiments of the inventive concept will be described in detail so that those skilled in the art easily carry out the inventive concept.

Figure 1:
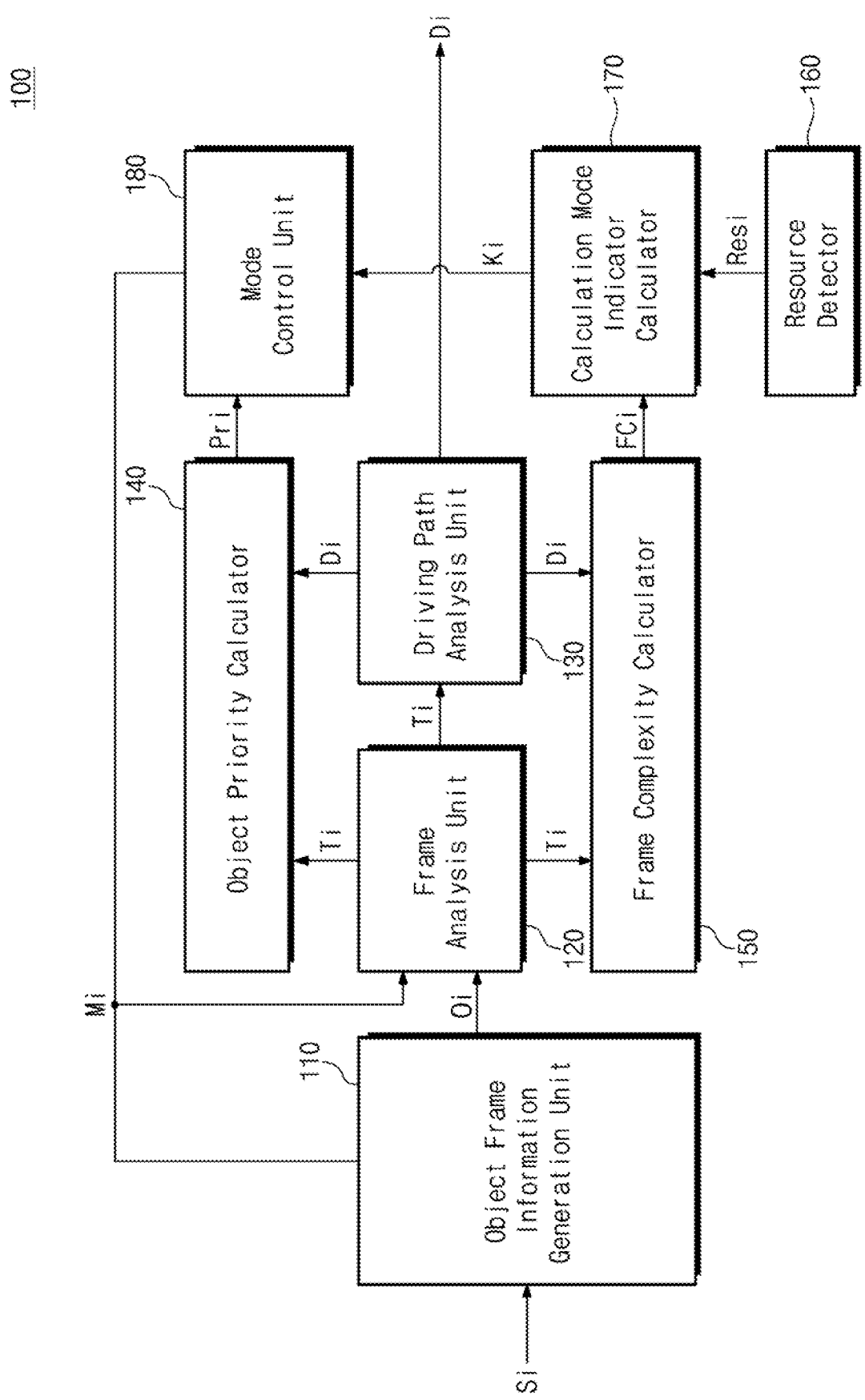
FIG. 1 is a block diagram of an object recognition device according to an embodiment of the inventive concept.

FIG. 1 is a block diagram of an object recognition device according to an embodiment of the inventive concept. Referring to FIG. 1, an object recognition device 100 includes an object frame information generation unit 110, a frame analysis unit 120, a driving path analysis unit 130, an object priority calculator 140, a frame complexity calculator 150, a resource detector 160, a calculation mode indicator calculator 170, and a mode control unit 180. Although the object recognition device 100 of FIG. 1 classifies the components by functional groups for convenience of description, the components may be implemented in a single chip or an integrated circuit without limitation.

The object frame information generation unit 110 receives sensing information Si from a sensor unit to be described later. In relation to the sensing information Si, the object frame information generation unit 110 recognizes the peripheral object based on the sensing information Si. The object frame information generation unit 110 may extract the feature vector of an object and recognize the type, shape, distance, or color of the object. The object frame information generation unit 110 generates object frame information Oi based on the recognized object.

The object frame information generation unit 110 may generate the object frame information Oi using a machine learning algorithm. The object frame information generation unit 110 may extract the feature vectors of objects using the parameters learned by the machine learning algorithm. For example, the object frame information generation unit 110 may extract feature vectors using learned parameters to recognize objects such as vehicles, pedestrians, and guard rails. Also, the object frame information generation unit 110 may use learned parameters in order not to recognize objects such as rainwater.

The object frame information Oi may include various information related to the feature of the object. For example, the object frame information Oi may include at least one of object ID information, object type information, object position information, object size information, or object color information. The object frame information generation unit 110 generates the object frame information Oi in a frame unit. The object frame information generation unit 110 generates the object frame information Oi different from object frame information for a previous frame according to movement of the object or movement of the user vehicle.

The frame analysis unit 120 receives the object frame information Oi. The frame analysis unit 120 generates object tracking information Ti based on the object frame information Oi. The frame analysis unit 120 generates the object tracking information Ti by predicting the position of the object for the next frame. For example, the frame analysis unit 120 may receive the object frame information Oi for the current frame, and may compare and analyze the object tracking information Ti and the object frame information Oi for the previous frame.

The frame analysis unit 120 may predict the predicted position or predicted speed of the object based on the difference between the object tracking information Ti and the object frame information Oi for the previous frame. The frame analysis unit 120 may generate object tracking information Ti based on the predicted position or predicted speed of the object. Alternatively, the frame analysis unit 120 may generate the object tracking information Ti using the object frame information Oi for the previous frame and the object frame information Oi for the current frame. The frame analysis unit 120 generates the object tracking information Ti in a frame unit.

The object tracking information Ti may include various information related to the feature of the object. For example, the object tracking information Ti may include at least one of object ID information, object type information, object position information, object speed information, object creation information, object extinction information, object size information, and object color information. The object position information may be the predicted position information of an object for the next frame. The object speed information may be the prediction speed information of an object for the next frame. The object creation information may be provided when a new object is recognized. Alternatively, the object creation information may be provided to include an object in a tracking object when a skip mode changes to a low calculation mode, which will be described later. The object extinction information may be provided when the object being recognized is no longer recognized. Alternatively, the object extinction information may be provided when an object is excluded from the tracking object by a skip mode, which will be described later.

The driving path analysis unit 130 receives the object tracking information Ti. The driving path analysis unit 130 generates driving path information Di based on the object tracking information Ti. The driving path analysis unit 130 generates the driving path information Di by determining the driving path of a vehicle for the next frame. The driving path analysis unit 130 may receive driving map information and destination information from an external memory or storage to determine an optimized driving path. The driving path analysis unit 130 may determine the optimization path to the destination based on the driving map information and the destination information.

The driving path analysis unit 130 provides the driving path information Di to a vehicle control device to be described later. The vehicle control device receives the driving path information Di and recognizes the driving path to be moved in the next frame. The vehicle control device controls the vehicle based on the driving path information Di. The driving path analysis unit 130 generates the driving path information Di in a frame unit.

The object priority calculator 140 receives the object tracking information Ti from the frame analysis unit 120. The object priority calculator 140 receives the driving path information Di from the driving path analysis unit 130. The object priority calculator 140 generates priority information Pri based on the object tracking information Ti and the driving path information Di. When a plurality of objects are recognized, the priority is based on the need or importance to be considered preferentially during autonomous driving.

The priority information Pri may include object ID information, object position information, and object priority information. For example, the object priority information may be information related to the ranking for the possibility of affecting driving of a vehicle among the recognized objects. The priority information Pri may be generated based on the possibility of collision between the vehicle and the object. That is, an object having a high possibility of collision with the vehicle may have the priority information Pri corresponding to the priority.

The object priority calculator 140 may calculate the possibility of collision between the objects and the vehicle using the object tracking information Ti and the driving path information Di. The object priority calculator 140 may detect the position, speed, and moving direction of objects using the object tracking information Ti. The object priority calculator 140 may detect the position, speed, and moving direction of objects using the object tracking information Ti. The object priority calculator 140 may detect a distance difference, a speed difference, and a driving direction difference between the objects and the vehicle using the detected information. The object priority calculator 140 calculates the probability of collision for each of the objects based on the relationship between the calculated objects and the vehicle. The object priority calculator 140 assigns priority to the object IDs with high possibility of collision.

The frame complexity calculator 150 receives the object tracking information Ti from the frame analysis unit 120. The frame complexity calculator 150 receives the driving path information Di from the driving path analysis unit 130. The frame complexity calculator 150 calculates the frame complexity based on the object tracking information Ti and the driving path information Di. The frame complexity calculator 150 generates frame complexity information FCi based on the calculated frame complexity. The frame complexity calculator 150 may receive driving map information from an external memory or storage to reflect the driving path in frame complexity.

The frame complexity may be divided into object complexity and path complexity. The object complexity may be calculated based on the number of objects and the distribution of objects. The frame complexity calculator 150 may calculate the number of objects and the distribution of objects based on the object tracking information Ti. For example, the frame complexity calculator 150 may calculate the number of objects based on the number of object ID information included in the object tracking information Ti. The frame complexity calculator 150 may calculate the dispersion according to the distribution of objects by extracting object position information included in the object tracking information Ti. As the number of objects increases, the object complexity increases, and as the dispersion according to the distribution of objects decreases, the object complexity decreases. The frame complexity calculator 150 may calculate the object complexity by dividing the number of objects by the dispersion and then multiplying the weight coefficient.

The path complexity may be calculated based on the state of the driving path. The frame complexity calculator 150 may calculate the path complexity based on the driving information Di or the driving map information. For example, the frame complexity calculator 150 may calculate the number of lanes of a driving path, the dispersion according to the object distribution, the number of intersections, and the number of traffic signals from the driving information Di or the driving map information. The frame complexity calculator 150 may multiply the weight coefficient for each of the number of lanes, the dispersion according to the object distribution, the number of intersections, and the number of traffic signals. The frame complexity calculator 150 may calculate the path complexity by summing the number of lanes, the dispersion according to the object distribution, the number of intersections, and the number of traffic signals, where the weight is reflected. The frame complexity may be calculated with the sum of the object complexity and the path complexity.

The resource detector 160 detects a resource occupation state. The resource occupation state corresponds to the occupation state of a processor or memory to be described later. The resource detector 160 detects the occupation rate of the processor or the memory. The resource detector 160 generates resource information Resi based on the occupation rate of the processor or the memory.

The object recognition device 100 may generate the object frame information Oi, the object tracking information Ti, the driving path information Di, the priority information Pri and the frame complexity information FCi according to the control of the processor. The object recognition device 100 may store in the memory the object frame information Oi, the object tracking information Ti, the driving path information Di, the priority information Pri and the frame complexity information FCi. As the number of objects perceived increases, the calculation amount of the processor and the overload thereof are predicted. As the number of objects perceived increases, the calculation amount of the processor increases and the overload thereof is predicted. That is, the number of objects perceived increases, the occupation rate of the processor or the memory increases.

The calculation mode indicator calculator 170 receives the frame complexity information FCi from the frame complexity calculator 150. The calculation mode indicator calculator 170 receives the resource information Resi from the resource detector 160. The calculation mode indicator calculator 170 generates a calculation mode indicator Ki based on the frame complexity information FCi and the resource information Resi. The calculation mode indicator Ki is generated based on the frame complexity and the resource occupation state.

The calculation mode indicator Ki may be determined by increasing, decreasing, or maintaining the frame complexity. The calculation mode indicator Ki may be determined by whether the resource occupation state is the Full state or not. For example, the calculation mode indicator Ki may be determined based on the frame complexity and the resource occupation state, as shown in Table 1.

TABLE 1

| Frame complexity | Resource occupation state | Calculation mode indicator (Ki) |
| --- | --- | --- |
| Increase | Full | −2 |
| decrease or maintain | Full | −1 |
| Increase | Not Full | 1 |
| Decrease or maintain | Not Full | 2 |

Referring to Table 1, the calculation mode indicator calculator 170 may determine the polarity of the calculation mode indicator Ki based on the resource occupation state. The calculation mode indicator calculator 170 may determine the absolute value of the calculation mode indicator Ki based on the frame complexity. Although the generation of the calculation mode indicator in Table 1 is described as being divided into four indicators, it is not limited thereto. For example, the calculation mode indicator Ki may be divided into more than four or fewer than four by varying the classification criterion of the frame complexity or the resource occupation state.

When the frame complexity increases more than the previous frame and the resource occupation state is the Full state, the calculation mode indicator Ki indicates −2. When the frame complexity is decreased or equal to the previous frame and the resource occupation state is the Full state, the calculation mode indicator Ki indicates −1. When the frame complexity increases than the previous frame and the resource occupation state is the Not Full state, the calculation mode indicator Ki indicates 1. When the frame complexity is decreased or equal to the previous frame and the resource occupation state is the Not Full state, the calculation mode indicator Ki indicates 2. That is, the calculation mode indicator calculator 170 may generate the calculation mode indicator Ki having a higher value as the resource occupation state is available and the frame complexity is lower.

The mode control unit 180 receives the calculation mode indicator Ki from the calculation mode indicator calculator 170. The mode control unit 180 receives the priority information Pri from the object priority calculator 140. The mode control unit 180 generates a mode control signal Mi based on the calculation mode indicator Ki and the priority information Pri. The mode control unit 180 may determine the conversion ranking of the calculation processing of objects based on the priority information Pri. The mode control unit 180 may determine whether to convert the calculation processing of objects based on the calculation mode indicator Ki.

The mode control unit 180 may select at least one of a high calculation mode control signal, a low calculation mode control signal, and a skip mode control signal as a mode control signal Mi. The high calculation mode control signal controls the object recognition device 100 to operate in the high calculation mode. The low calculation mode control signal controls the object recognition device 100 to operate in the low calculation mode. The skip mode control signal controls the object recognition device 100 to operate in the skip mode. In the high calculation mode, the object recognition device 100 sets a high calculation amount to ensure accuracy when generating the object frame information Oi or the object tracking information Ti. In the low calculation mode, when generating the object frame information Oi or the object tracking information Ti, the object recognition device 100 sets the calculation amount to be lower than the high calculation mode in order to prevent the overload of the processor or the memory. In the skip mode, the object recognition device 100 blocks the generation of the object frame information Oi or the object tracking information Ti.

The mode control unit 180 may generate a high calculation mode control signal, a low calculation mode control signal, or a skip mode control signal in an object unit. The mode control unit 180 may determine the area of objects calculated by the high calculation mode, the area of the objects calculated by the low calculation mode, and the areas of the objects whose calculation is restricted by the skip mode. The mode control signal Mi may include calculation mode information and area information. The calculation mode information may be information for determining an operation mode of the object recognition device 100. The area information may be information on an object recognition range operating in a high calculation mode, a low calculation mode, or a skip mode. The object recognition device 100 may determine an operation mode of objects belonging to the corresponding area based on the area information.

Mode control unit 180 provides the mode control signal Mi to the object frame information generation unit 110. The object frame information generation unit 110 determines a calculation amount for object recognition based on the mode control signal Mi. The object frame information generation unit 110 determines whether to increase, decrease, or not to calculate a calculation amount for object recognition according to the mode control signal Mi. The mode control unit 180 provides the mode control signal Mi to the frame analysis unit 120. The frame analysis unit 120 may determine the object to be excluded from the tracking object in response to the skip mode control signal among the mode control signals Mi. The frame analysis unit 120 does not calculate the object corresponding to the skip mode. Therefore, the amount of calculation and the calculation time for generating object tracking information Ti for the next frame may be reduced.

The mode control unit 180 may receive the calculation mode indicator Ki according to the criteria of Table 1. When the calculation mode indicator Ki is a negative number, an object having the priority information Pri of the lowest ranking among the objects calculated from the previous frame in the high calculation mode is calculated in the low calculation mode. When the calculation mode indicator Ki is a negative number, an object having the priority information Pri of the lowest ranking among the objects calculated from the previous frame in the low calculation mode is not calculated in the high calculation mode. When the calculation mode indicator Ki is −2, the number of objects which are converted from the high calculation mode to the low calculation mode or from the low calculation mode to the skip mode may be set to 2. When the calculation mode indicator Ki is −1, the number of objects which are converted from the high calculation mode to the low calculation mode or from the low calculation mode to the skip mode may be set to 1.

When the calculation mode indicator Ki is a positive number, an object having the priority information Pri of the highest ranking among the objects that operate in the skip mode in the previous frame and are not calculated is calculated in the low calculation mode. When the calculation mode indicator Ki is a positive number, an object having the priority information Pri of the highest ranking among the objects calculated from the previous frame in the low calculation mode is calculated in the high calculation mode. When the calculation mode indicator Ki is 2, the number of objects which are converted from the skip mode to the low calculation mode or from the low calculation mode to the high calculation mode may be set to 2. When the calculation mode indicator Ki is 1, the number of objects which are converted from the skip mode to the low calculation mode or from the low calculation mode to the high calculation mode may be set to 1.

The object recognition device 100 may adaptively adjust the amount of calculation based on the frame complexity and the resource occupation state. When the resource occupation state is the Full state, the object recognition device 100 may gradually decrease the amount of calculation and may not recognize the objects of a low ranking. Accordingly, the object recognition device 100 may improve the processing speed degradation or error due to the overload of an autonomous driving system. The object recognition device 100 may lower the degree of increase in the amount of calculation or increase the degree of reduction in the amount of calculation when the frame complexity is complex. Therefore, the object recognition device 100 may prevent an overload due to calculation processing in a complex peripheral situation.

Figure 2:
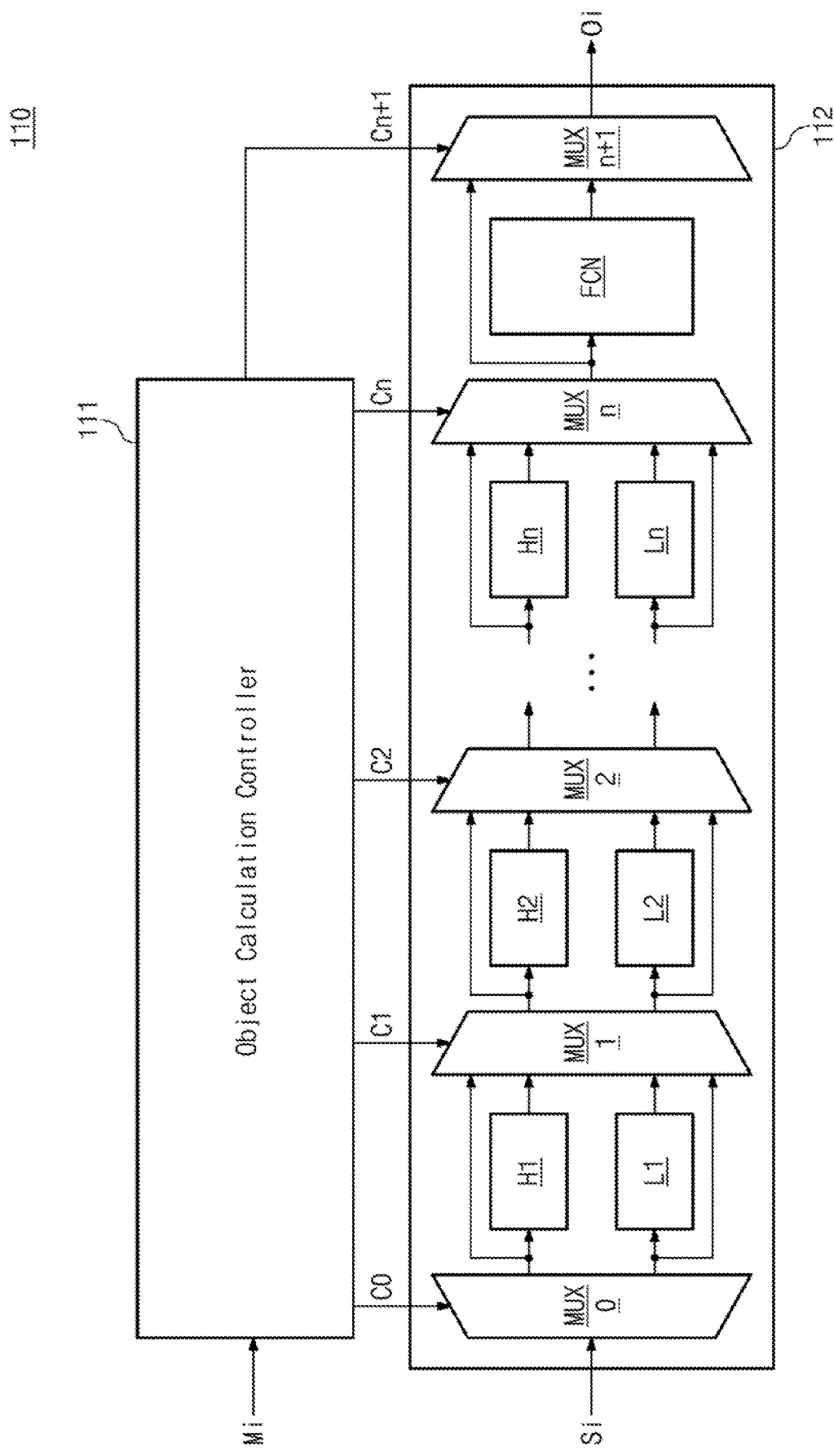
FIG. 2 is a block diagram of an object frame information generation unit according to an embodiment of the inventive concept.

FIG. 2 is a block diagram of an object frame information generation unit according to an embodiment of the inventive concept. The object frame information generation unit 110 corresponds to the object frame information generation unit 110 of FIG. 1. Referring to FIG. 2, the object frame information generation unit 110 includes an object calculation controller 111 and an object calculator 112. The object calculator 112 includes a plurality of multiplexers MUX, first to nth feature extraction high calculators H1 to Hn, first to nth feature extraction low calculators L1 to Ln, and a fully connected network calculator FCN.

The object calculation controller 111 receives the mode control signal Mi from the mode control unit 180 of FIG. 1. The object calculation controller 111 generates a plurality of object calculator control signals C0 to Cn+1 based on the mode control signal Mi. The object calculation controller 111 controls the object calculator 112 using the plurality of object calculator control signals C0 to Cn+1. The plurality of object calculator control signals C0 to Cn+1 may have different values depending on the type of the mode control signal Mi. That is, the plurality of object calculator control signals C0 to Cn+1 by the high calculation mode control signal, the plurality of object calculator control signals C0 to Cn+1 by the low calculation mode control signal, and the plurality of object calculator control signals C0 to Cn+1 by the skip mode control signal may have different values.

The object calculator 112 receives the plurality of object calculator control signals C0 to Cn+1. The object calculator 112 receives the sensing information Si. The plurality of object calculator control signals C0 to Cn+1 are applied to the plurality of multiplexers MUX1 to MUXn+1. The plurality of multiplexers MUX1 to MUXn+1) determine an output path of information inputted based on the plurality of object calculator control signals C0 to Cn+1. The object calculator 112 includes the plurality of multiplexers MUX1 to MUXn+1, the first to nth feature extraction high calculators H1 to Hn, and the first to nth feature extraction low calculators L1 to Ln, which are disposed in a multilayer structure to extract various features for object.

The 0th multiplexer MUX0 determines the transmission path of the sensing information Si based on the 0th object calculator control signal C0. When the 0th object calculator control signal C0 is generated based on the high calculation mode control signal, the 0th multiplexer MUX0 outputs the sensing information Si to the first feature extraction high calculator H1. When the 0th object calculator control signal C0 is generated based on the low calculation mode control signal, the 0th multiplexer MUX0 outputs the sensing information Si to the first feature extraction low calculator L1. The first to nth multiplexers MUX1 to MUXn−1 outputs the input information to the second to nth feature extraction high calculator H2 to Hn or the second to nth feature extraction low calculator L2 to Ln based on the first to nth object calculator control signals C1 to Cn−1.

The first to nth feature extraction high calculators H1 to Hn and the first to nth feature extraction low calculators L1 to Ln are calculators for extracting specific features from the sensed sensing information Si. The specific feature may include the size, color, type, or position of the object. For example, the first to nth feature extraction high calculators H1 to Hn and the first to nth feature extraction low calculators L1 to Ln may perform convolution calculation and sub-sampling on the inputted information. The convolution calculation and sub-sampling of the object calculator 112 may correspond to a Convolution Neural Networks scheme that defines an area from which features are extracted. As the information passes through the first to nth feature extraction high calculators H1 to Hn and the first to nth feature extraction low calculators L1 to Ln, the area from which features are extracted may decrease gradually, and only the information corresponding to the features may be extracted.

The first to nth feature extraction high calculators H1 to Hn have a larger amount of calculation than the first to nth feature extraction low calculators L1 to Ln. However, the first to nth feature extraction high calculators H1 to Hn extract features more accurately than the first to nth feature extraction low calculators L1 to Ln, and recognize the object. In the high calculation mode, the object frame information generation unit 110 may use the first to nth feature extraction high calculators H1 to Hn to ensure the accuracy of object recognition. In the low calculation mode, the object frame information generation unit 110 may use first to nth feature extraction low calculators L1 to Ln to prevent errors or processing time delays due to overload of the autonomous driving system.

The fully connected network calculator FCN receives information processed by a number of paths. The fully connected network calculator FCN maps information classified by a plurality of areas. The fully connected network calculator FCN collects information classified by a plurality of areas and generates object frame information Oi. The fully connected network calculator FCN may generate the object frame information Oi, which is a one-dimensional matrix. The object calculator 112 may recognize an object using various methods in addition to the deep-learning technique using the CNN method described above. For example, the object calculator 112 may recognize an object using a haar-like feature vector or a Histogram of Gradients (HoG) feature vector. Alternatively, the object calculator 112 may recognize an object using a classifier such as Adaboost, SVM, and the like.

Figure 3:
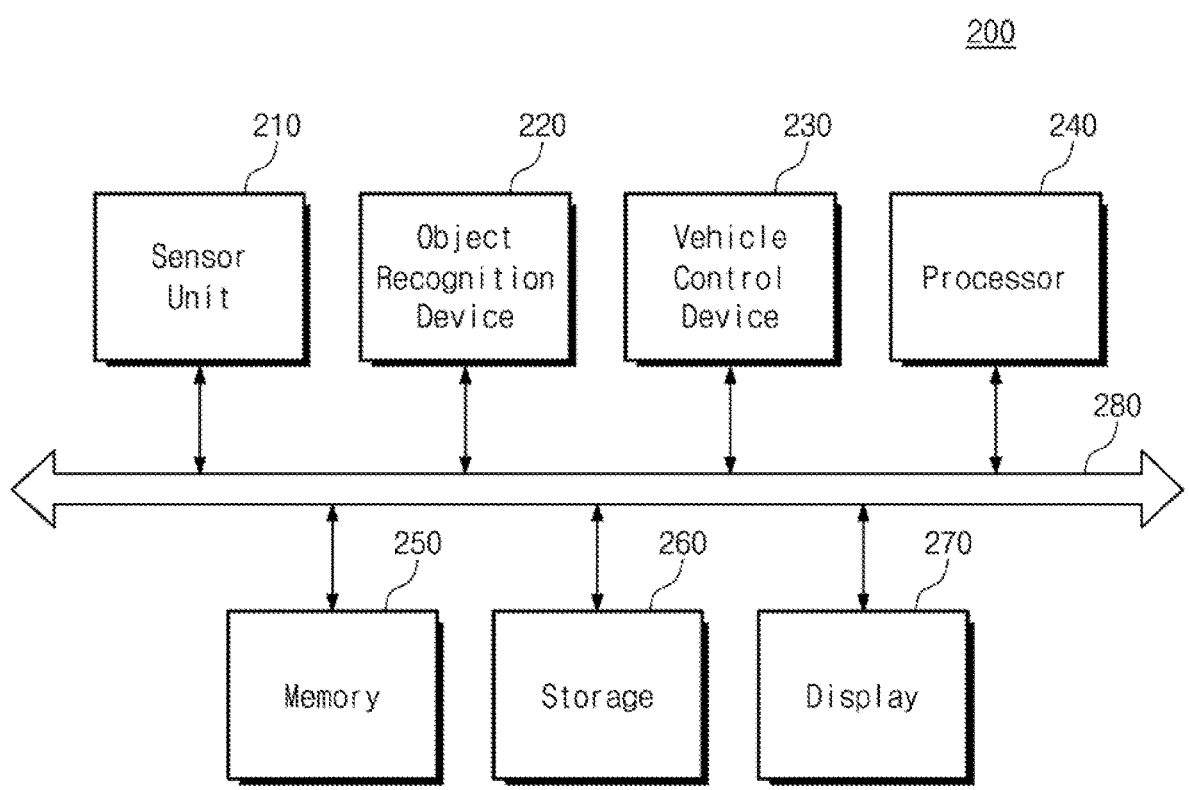
FIGS. 3 and 4 are block diagrams of an autonomous driving system according to an embodiment of the inventive concept.

FIG. 3 is a block diagram of an autonomous driving system. Referring to FIG. 3, the autonomous driving system 200 includes a sensor unit 210, an object recognition device 220, a vehicle control device 230, a processor 240, a memory 250, a storage 260, a display 270, and a bus 280. The autonomous driving system 200 may further include various components to achieve the purpose of autonomous driving. For example, the autonomous driving system 200 may include a navigation device for receiving path information to a destination, a communication module device for communicating with an external electronic device, or a user interface for engaging in vehicle driving.

The sensor unit 210 receives signals from the periphery. The sensor unit 210 may sense a signal provided from surrounding objects. Alternatively, the sensor unit 210 may provide signals to surrounding objects and sense the reflected signals from the objects. The sensor unit 210 may include a plurality of sensing sensors for sensing objects in all directions. For example, when the autonomous driving system 200 is installed in the vehicle, the sensor unit 210 may be provided at the front, rear, and sides of the vehicle. The sensor unit 210 may include various types of sensing sensors to accurately sense objects.

The object recognition device 220 may be the object recognition device 100 of FIG. 1. The object recognition device 220 recognizes surrounding objects based on a signal sensed by the sensor unit 210. The objects may include vehicles, pedestrians, animals, guard rails, obstacles, and the like. The object recognition device 220 extracts and classifies the features of the objects. For example, the object recognition device 220 may receive the image information of the periphery and extract the feature vectors of the objects by analyzing the image information. The object recognition device 220 may distinguish the background and the object based on the feature vector. The object recognition device 220 may recognize objects in a frame unit. Accordingly, the object recognition device 220 may recognize not only the static position of the object but also the dynamic movement of the object.

The vehicle control device 230 controls the speed and steering angle of the vehicle. In addition, the vehicle control device 230 may control various devices provided in the vehicle, such as a headlight. The vehicle control device 230 controls the vehicle depending on the objects recognized by the object recognition device 220. That is, the vehicle equipped with the autonomous driving system 200 detects the presence, position, and movement of surrounding objects in order to prevent collision with other objects and to provide an optimized driving path. The vehicle control device 230 controls the movement of the vehicle based on the object information recognized by the object recognition device 120.

The processor 240 may function as a central control device of the autonomous driving system 200. The processor 240 may perform the control operations and calculation operations required to implement the autonomous driving system 200. For example, the object recognition device 220 may receive signals from the sensor unit 210 according to the control of the processor 240 and recognize objects. The vehicle control device 230 may receive information on the objects from the object recognition device 220 according to the control of the processor 240, and control the movement of the vehicle. The processor 240 may operate utilizing the calculation space of the memory 250. The processor 240 may read files for executing the operating system and application execution files from the storage 260. The processor 240 may execute the operating system and various applications.

The memory 250 may store data and process codes processed or to be processed by the processor 240. For example, the memory 250 may store information sensed by the sensor unit 210, information for recognizing an object in the object recognition device 220, and information on an object recognized in the object recognition device 220. The memory 250 may be used as the main memory of the autonomous driving system 200. The memory 250 may include a dynamic random access memory (DRAM), a static random access memory (SRAM), a phase change RAM (PRAM), a magnetic RAM (MRAM), a ferroelectric RAM (FeRAM), and so on.

The storage 260 may store data generated by the operating system or applications for the purpose of long-term storage, a file for running the operating system, or executable files of applications. For example, the storage 260 may store files for executing the sensor unit 210, the object recognition device 220, and the vehicle control device 230. The storage 260 may be used as an auxiliary storage for the autonomous driving system 200. The storage 260 may include a flash memory, a phase-change RAM (PRAM), a magnetic RAM (MRAM), a ferroelectric RAM (FeRAM), a resistive RAM (RRAM), and so on.

The display 270 may receive and display data generated by the sensor unit 210, the object recognition device 220, or the vehicle control device 230. The display 270 may receive and display data stored in the memory 250 or the storage 260. The display 270 may include a Liquid Crystal Display (LCD), an Organic Light Emitting Diode (OLED), an Active Matrix OLED (AMOLED), a flexible display, and an electronic ink.

The bus 280 may provide a communication path between the components of the autonomous driving system 200. The sensor unit 210, the object recognition device 220, the vehicle control device 230, the processor 240, the memory 250, the storage 260, and the display 270 may exchange data with each other through the bus 280. The bus 280 may be configured to support various types of communication formats used in the autonomous driving system 200.

Figure 4:
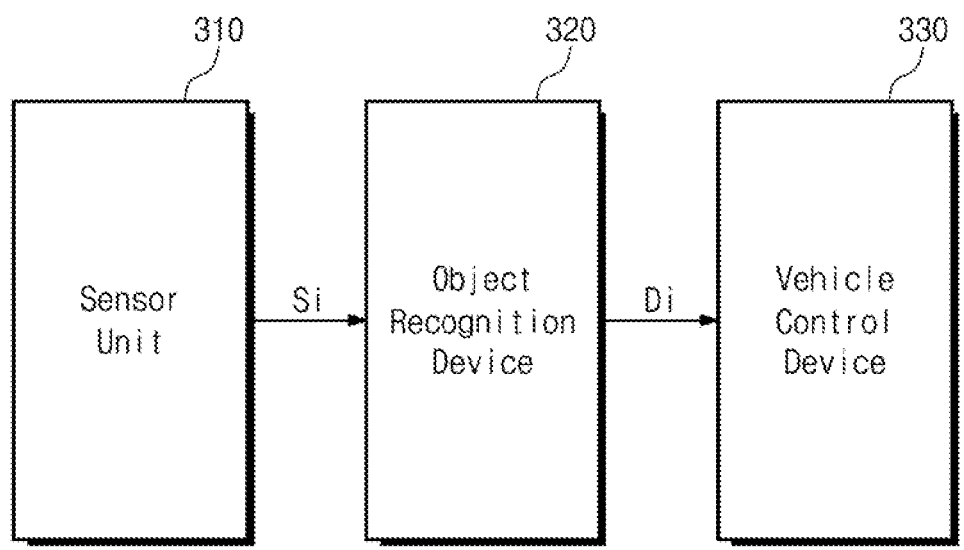

FIG. 4 is a block diagram of an autonomous driving system. Referring to FIG. 4, the autonomous driving system 300 includes a sensor unit 310, an object recognition device 320, and a vehicle control device 330. The autonomous driving system 300 of FIG. 4 will be understood as a block diagram for specifically describing the information transmission/reception relationship between the respective components.

The sensor unit 310 senses the periphery to generate sensing information Si. The sensor unit 310 may sense the periphery and convert the generated analog signal into the sensing information Si, which is a digital signal. The sensor unit 310 may include an analog-to-digital converter for converting an analog signal to a digital signal. The sensor unit 310 may detect the periphery in a frame unit to generate the frame sensing information Si.

The object recognition device 320 may be the object recognition device 100 of FIG. 1. The object recognition device 320 receives the sensing information Si from the sensor unit 310. The object recognition device 320 recognizes the objects by analyzing the sensing information Si. The object recognition device 320 receives the sensing information Si in a frame unit. Accordingly, the object recognition device 320 may recognize the movement or change of the object over time. The object recognition device 320 may determine the number of recognizable objects in a frame unit based on the sensing range of the periphery of the sensor unit 310. For example, the object recognition device 320 may recognize objects in a certain radius range.

The object recognition device 320 may add or delete objects to be recognized in a frame unit. Alternatively, the object recognition device 320 may adjust the amount of calculation for recognizing the objects. For example, the object recognition device 320 may not recognize an object that is less likely to affect the stability of autonomous driving, or reduce the amount of calculation based on the position or speed of the object recognized in the previous frame. The object recognition device 320 may recognize a new object not recognized in the previous frame. When the new object is likely to affect the stability of autonomous driving, the object recognition device 320 may recognize a new object or increase the amount of calculation for recognizing an existing object. The criteria for adding or deleting objects, or changing a calculation amount may be set based on the object's priority, frame complexity, and resource occupation state.

The object recognition device 320 generates driving path information Di based on the recognized objects. The driving path information Di includes information on the driving path of the vehicle for the next frame. The object recognition device 320 may generate the driving path information Di based on the position and speed of the objects. The object recognition device 320 may additionally receive destination information or map information stored in the memory 250 or the storage 260 of FIG. 3. The object recognition device 320 may analyze the relationship between the objects and the vehicle on the basis of the sensing information Si, analyze the optimized path based on the destination information or the map information, and then generate the driving path information Di.

The vehicle control device 330 receives the driving path information Di from the object recognition device 320. However, the inventive concept is not limited to this, and the vehicle control device 330 may receive information on the objects from the object recognition device 320 and directly generate the driving path information Di. In this case, the vehicle control device 330 may receive the destination information or the map information from the memory 250 or the storage 260 of FIG. 3.

The vehicle control device 330 generates a vehicle control signal based on the driving path information Di. The vehicle control signal may be a signal for controlling the steering angle or speed for the vehicle to travel to the driving path. The vehicle control device 330 provides the vehicle control signal to a vehicle drive device for driving the vehicle. The vehicle driving device moves the vehicle to the driving path without the user's involvement based on the vehicle control signal. The vehicle driving device may include a device for determining the traveling speed and the steering angle of the vehicle.

Figure 5:
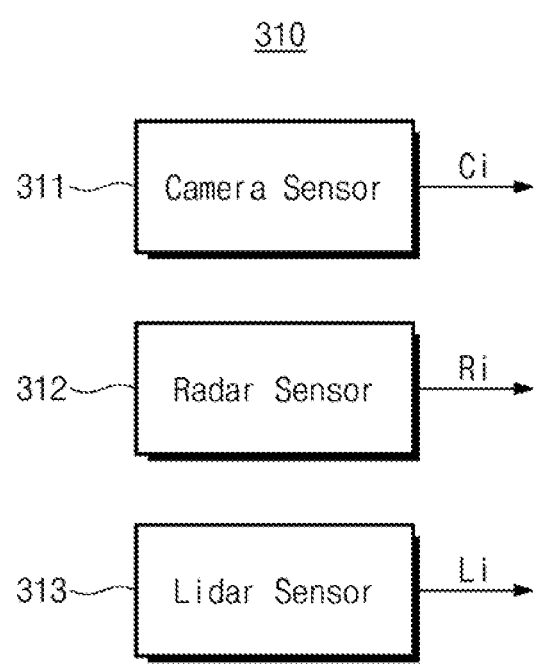
FIG. 5 is a block diagram of a sensor unit according to an embodiment of the inventive concept.

FIG. 5 is a block diagram of the sensor unit of FIG. 4. Referring to FIG. 5, the sensor unit 310 includes a camera sensor 311, a radar sensor 312, and a lidar sensor 313. The sensor unit 310 of FIG. 3 will be understood as an embodiment for sensing a plurality of signals. The sensor unit 310 may further include various sensors for sensing the periphery. For example, the sensor unit 310 may further include a microphone for sensing sounds.

The camera sensor 311 senses an image of the periphery. The camera sensor 311 generates image frame information Ci based on the sensed image. The camera sensor 311 may include an analog-to-digital converter for converting the sensed analog signal into the image frame information Ci, which is a digital signal. The camera sensor 311 may include a plurality of cameras. The plurality of cameras may be disposed at the front, the side, and the rear of the vehicle. The plurality of cameras may capture images in different directions. That is, the camera sensor 311 may include a plurality of cameras for sensing the entire image in the periphery in order to secure the stability of the autonomous driving system 300.

The radar sensor 312 emits an electromagnetic wave to the periphery and senses the reflected electromagnetic wave. The radar sensor 312 may emit microwaves. The radar sensor 312 generates radar frame information Ri based on the reflected microwave. The radar sensor 312 may include an analog-to-digital converter for converting the sensed analog signal into the radar frame information Ri, which is a digital signal. The radar sensor 312 may measure the distance and direction of the object based on the time of the reflected electromagnetic waves. The radar sensor 312 emits an electromagnetic wave in all directions of the periphery to sense an object existing in all directions within a sensing range.

The lidar sensor 313 emits an electromagnetic wave to the periphery and senses the reflected electromagnetic wave. The lidar sensor 313 may emit a laser having a shorter wavelength than the microwave. The lidar sensor 313 generates lidar frame information Li based on the reflected laser. The lidar sensor 313 may include an analog-to-digital converter for converting the sensed analog signal into lidar frame information Li, which is a digital signal. The lidar sensor 313 may measure the distance and direction of the object based on the time of the reflected electromagnetic waves. Since the lidar sensor 313 uses electromagnetic waves having a shorter wavelength than the radar sensor 312, the accuracy, resolution, and signal-to-noise ratio of the distance measurement may be improved. However, the lidar sensor 313 has a smaller detection range than the radar sensor 312.

The image frame information Ci, the radar frame information Ri, and the lidar frame information Li are provided to the object recognition device 320. The sensor unit 310 generates the image frame information Ci, the radar frame information Ri, and the lidar frame information Li in a frame unit. The object recognition device 320 recognizes an object in a frame unit based on the image frame information Ci, the radar frame information Ri, and the lidar frame information Li. The sensor unit 310 may further include a sensor synchronization unit for synchronizing the image frame information Ci, the radar frame information Ri, and the lidar frame information Li.

The sensor unit 310 may include various kinds of sensors to ensure the accuracy, stability, and reliability of the object recognition of the periphery. For example, the shape and type of the object may be recognized using the image frame information Ci by the camera sensor 311. The position and speed of the object may be accurately and diversely recognized using the radar sensor 312 and the lidar sensor 313.

Figure 6:
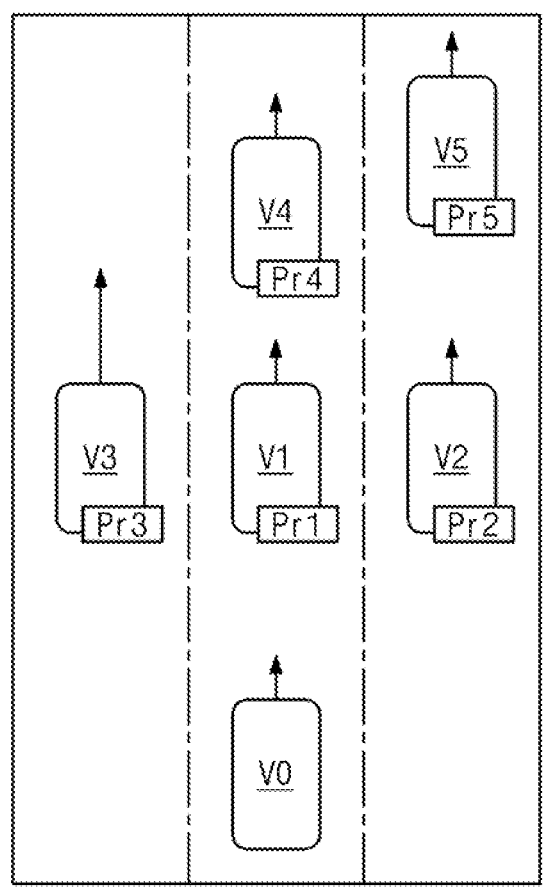
FIGS. 6 to 8 are views for explaining a process of generating priority information of objects according to an embodiment of the inventive concept.
Figure 7:
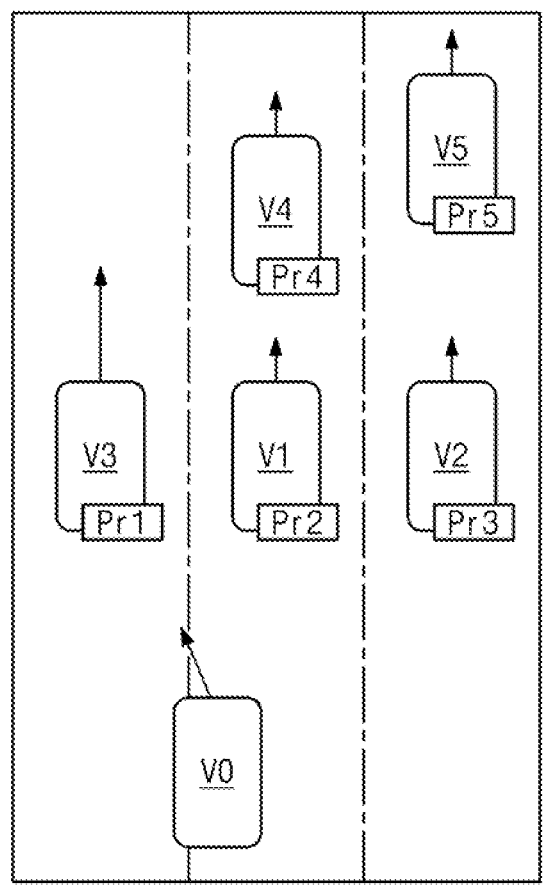
Figure 8:
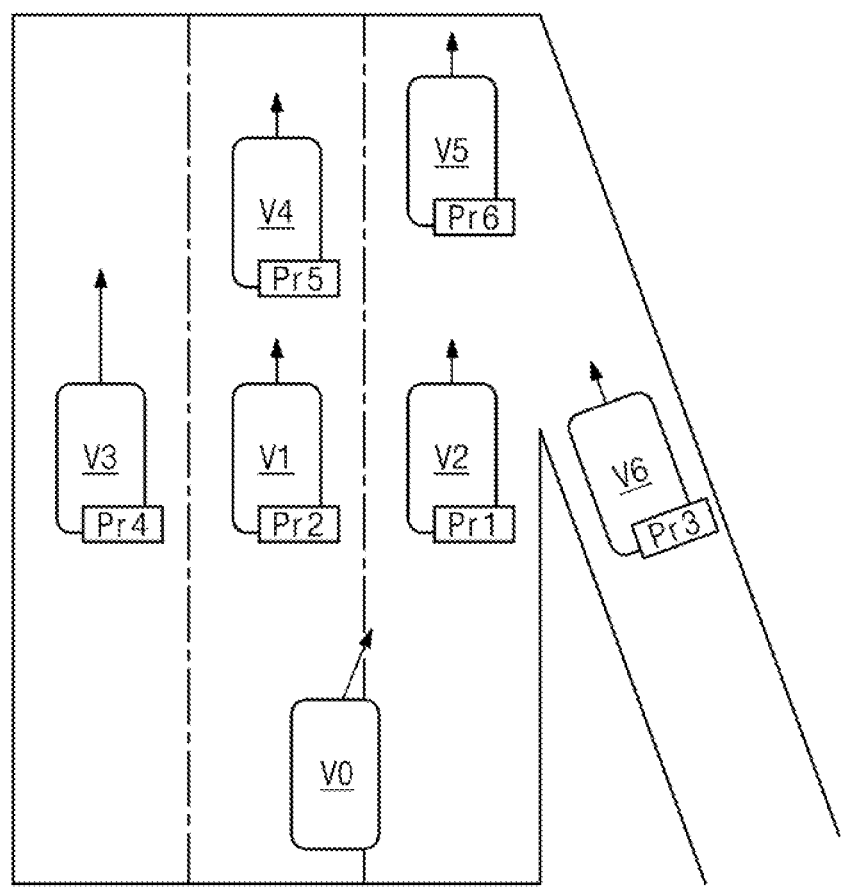

FIGS. 6 to 8 are views for explaining a process of generating priority information of objects according to an embodiment of the inventive concept. FIGS. 6 and 7 are plan views illustrating vehicles driving a three-lane road. FIG. 8 is a plan view illustrating vehicles driving a three-lane road and an intersection. Referring to FIGS. 5 to 7, the user's vehicle equipped with the object recognition device 100, 220, or 320 or the autonomous driving system 200 or 300 of the inventive concept is defined as V0. In FIGS. 6 and 7, the vehicle V0 recognizes first to fifth objects V1 to V5. In FIG. 8, the vehicle V0 recognizes first to sixth objects V1 to V6.

FIGS. 6 to 8 show priority information Pri for the first to sixth objects V1 to V6. FIGS. 6 and 7 show the first to fifth priority information Pr1 to Pr5, and FIG. 8 shows first to sixth priority information Pr1 to Pr6. The first priority information Pr1 will be understood as the highest ranking information and as priority information proceeds to the fifth priority information Pr5 or the sixth priority information Pr6, it will be understood as the lower ranking information. It will be understood that the arrows in FIGS. 6 to 8 represent the moving speed and direction of each of the vehicles or objects. Such priority information may be generated in the object priority calculator 140 of FIG. 1.

Referring to FIG. 6, the first to fifth objects V1 to V5 are moved in front of the vehicle V0. The first object V1 and the fourth object V4 are driving in the same lane as the vehicle V0. The third object V3 is driving in the left lane of the vehicle V0. The second object V2 and the fifth object V5 are driving in the right lane. The first object V1 corresponds to the first priority information Pr1. The second object V2 corresponds to the second priority information Pr2. The third object V3 corresponds to the third priority information Pr3. The third object V3 corresponds to the third priority information Pr3. The fifth object V5 corresponds to the fifth priority information Pr5.

The first object V1 has a distance closest to the vehicle V0 among the first to fifth objects V1 to V5. Therefore, the first object V1 has the highest collision probability with the vehicle V0, and the first priority information Pr1 is given to the first object V1. The second object V2 and the third object V3 have the next closest distance with respect to the first object V1. However, the third object V3 has a higher moving speed than the second object V2. That is, in the next frame, the third object V3 is farther away from the vehicle V0 than the second object V2. As a result, the possibility of collision between the second object V2 and the vehicle V0 is higher than the possibility of collision between the third object V3 and the vehicle V0. Accordingly, the second priority information Pr2 is given to the second object V2, and the third priority information Pr3 is given to the third object V3. In view of the possibility of collision, the fourth priority information Pr4 is given to the fourth object V4 and the fifth priority information Pr5 is given to the fifth object V5.

Referring to FIG. 7, the vehicle V0 enters the left lane from the center lane. The entry into the left lane may be the result of the vehicle control device 230 or 330 controlling the vehicle V0 based on the driving path information Di generated by the driving path analysis unit 130 of FIG. 1. According to the driving path change of the vehicle V0, the possibility of collision of the first to fifth objects V1 to V5 changes. Since the vehicle V0 moves to the lane where the third object V3 is driving, the third object V3 has the highest collision probability with the vehicle V0. Accordingly, the first priority information Pr1 is given to the third object V3. The second priority information Pr2 is given to the first object V1 having the next high possibility of collision. Sequentially, the third priority information Pr3 is given to the second object V2 and the fourth priority information Pr4 is given to the fourth object V4 and the fifth priority information Pr5 is given to the fifth object V5.

Referring to FIG. 8, the vehicle V0 enters the right lane from the center lane. The entry into the right lane may be the result of the vehicle control device 230 or 330 controlling the vehicle V0 based on the driving path information Di generated by the driving path analysis unit 130 of FIG. 1. Since the vehicle V0 moves to the lane where the second object V2 is driving, the second object V2 has the highest collision probability with the vehicle V0. Accordingly, the first priority information Pr1 is given to the second object V2. The second priority information Pr2 is given to the first object V1 having the next high possibility of collision.

The road in FIG. 8 includes an intersection. The intersection is connected to the right lane. The sixth object V6 drives the intersection and enters the right lane. The vehicle V0 recognizes the newly entered sixth object V6 within the object recognition range. The sensor unit 110 or 210 detects the sixth object V6 and the object recognition device 120 or 220 recognizes the object frame information Oi and the object tracking information Ti in consideration of the sixth object V6. The driving of the sixth object V6 and the vehicle V0 in the same lane is predicted. The sixth object V6 may have the next high collision probability with the vehicle V0 with respect to the first object V1 and the second object V2. Accordingly, the third priority information Pr3 is given to the sixth object V6. In addition, priority information may be given to the third to fifth objects V3 to V5 based on the distance difference and speed difference between the object and the vehicle V0.

FIGS. 9 to 12 are views for explaining a change of an object recognition range and a calculation mode according to an embodiment of the inventive concept. The positions of the objects and the movement of the vehicle V0 in FIGS. 9 to 12 are the same as in FIG. 7. That is, the same priority information is given to the first to fifth objects V1 to V5 as in FIG. 7. The first priority information Pr1, which is the priority information of the highest ranking, is given to the third object V3. The fifth priority information Pr5, which is the priority information of the lowest ranking, is given to the fifth object V5. The first to fifth priority information Pr1 to Pr5 may be generated in the object priority calculator 224 of FIG. 4.

Referring to FIGS. 9 to 12, the object recognition range is divided into a first area AR1, a second area AR2, and a third area AR3. The first area AR1 is defined as an object recognition range that operates in a high calculation mode. The second area AR2 is defined as an object recognition range that operates in a low calculation mode. The third area AR3 is defined as an object recognition range that operates in the skip mode. For convenience of explanation, objects belonging to the first area AR1 are indicated by solid lines. Objects belonging to the second area AR2 are indicated by dotted lines. The third area AR3 is indicated by a hatched area.

The object recognition range may be provided with the mixture of the first area AR1, the second area AR2, or the third area AR3. The information corresponding to the first area AR1 may be processed by the first to nth feature extraction high calculators H1 to Hn of FIG. 2. The information corresponding to the second area AR2 may be processed by the first to nth feature extraction low calculators L1 to Ln of FIG. 2. The information corresponding to the third area AR3 may be passed through without calculation processing by the first to nth feature extraction high calculators H1 to Hn or the first to nth feature extraction low calculators L1 to Ln.

In FIGS. 9 to 12, the change of the object recognition range is based on the calculation mode indicator Ki according to the criteria of Table 1. The calculation mode indicator Ki may be generated in the calculation mode indicator calculator 170 of FIG. 1. The object recognition range of FIGS. 9 to 12 depends on the calculation amount of the object frame information generation unit 110 adjusted according to the control of the mode control unit 180 of FIG. 1. That is, the vehicle V0 recognizes objects belonging to the same object recognition range according to the same calculation mode.

Figure 9:
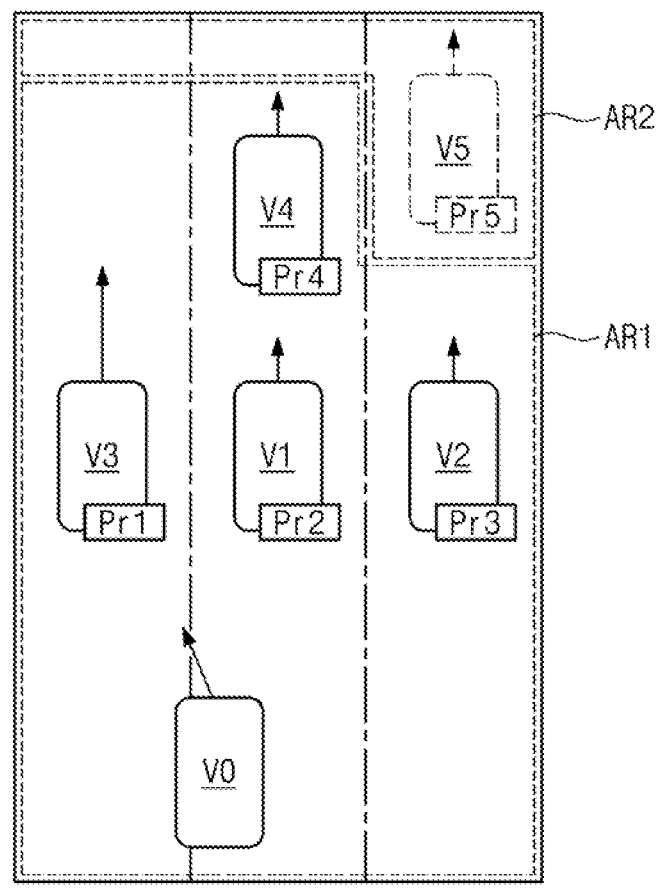
FIG. 9 to FIG. 12 are views for explaining a change of an object recognition range and a calculation mode according to an embodiment of the inventive concept.

Referring to FIG. 9, the first to fourth objects V1 to V4 belong to the first area AR1, and the fifth object V5 belongs to the second area AR2. For example, the first to fifth objects V1 to V5 may all be recognized as in the high calculation mode in the previous frame. In this case, the first to fifth objects V1 to V5 all belong to the first area AR1 in the previous frame. FIG. 9 may be a case where the calculation mode indicator Ki is −1. That is, the resource occupation state may be Full, and the frame complexity may be reduced as compared with the previous frame or maintained.

The object recognition device 100, 220, or 320 calculates, in the low calculation mode, the object having the priority information of the lowest ranking among the objects where the object frame information Oi is generated in the high calculation mode in the previous frame. The object to which the priority information of the lowest ranking is assigned is the fifth object V5 to which the fifth priority information Pr5 is assigned. The fifth object V5 has a smaller collision probability than other recognized objects. The mode control unit 228 changes the mode control signal Mi corresponding to the fifth object V5 to the low calculation mode control signal. The object recognition device 100, 220, or 320 generates the second area AR2 that recognizes the object in the low calculation mode.

Figure 10:
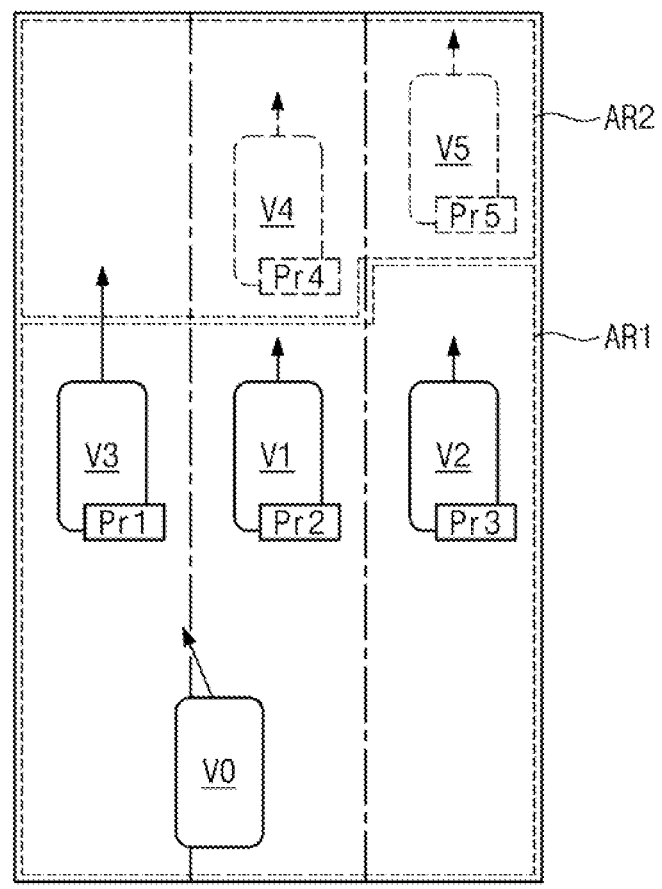

Referring to FIG. 10, the first to third objects V1 to V3 belong to the first area AR1, and the fourth and fifth objects V4 and V5 belong to the second area AR2. The first to third objects V1 to V3 are recognized by a higher calculation amount than the fourth and fifth objects V4 and V5. When the previous frame corresponds to FIG. 9, FIG. 10 may be a case where the calculation mode indicator Ki is −1. That is, the resource occupation state may be Full, and the frame complexity may be reduced as compared with the previous frame or maintained.

The object where the object frame information Oi is generated in the high calculation mode in the previous frame is the first to fourth objects V1 to V4. Among them, the object to which the priority information of the lowest ranking is assigned is the fourth object V4 to which the fourth priority information Pr4 is assigned. The mode control unit 228 changes the mode control signal Mi corresponding to the fourth object V4 to the low calculation mode control signal. The object recognition device 100, 220, or 320 extends the second area AR2 to include the fourth object V4. Since the resource occupation state is Full, the object recognition device 100, 220, or 320 extends the range of recognizing the object in the low calculation mode.

Figure 11:
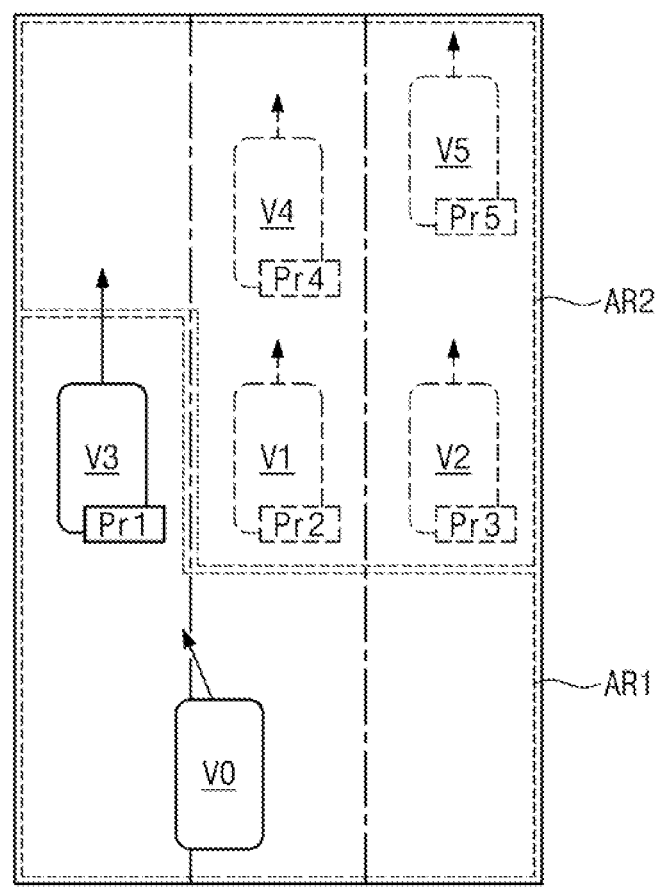

Referring to FIG. 11, the third object V3 to which the first priority information Pr1 is assigned belongs to the first area AR1. The first object V1, the second object V2, the fourth object V4 and the fifth object V5 belong to the second area AR2. When the previous frame corresponds to FIG. 10, FIG. 11 may be a case where the calculation mode indicator Ki is −2. That is, the resource occupation state may be Full, and the frame complexity may be increased as compared with the previous frame. Since the resource occupation state is Full, it is difficult to perform quick calculation processing. Additionally, since the frame complexity increases, the amount of calculation may be increased compared to the previous frame. Therefore, it is necessary to greatly lower the calculation amount more than when the calculation mode indicator Ki is −1.

The object where the object frame information Oi is generated in the high calculation mode in the previous frame is the first to third objects V1 to V3. Among them, the object to which the priority information of the lowest ranking is assigned is the second object V2 to which the third priority information Pr3 is assigned. The object to which the priority information of the next ranking is assigned is the first object V1 to which the second priority information Pr2 is assigned. The mode control unit 180 changes the mode control signal Mi corresponding to the first object V1 and the second object V2 to the low calculation mode control signal. The object recognition device 100, 220, or 320 extends the second area AR2 to include the first object V1 and the second object V2. As the frame complexity increases, the number of objects changed to the low calculation mode increases.

Figure 12:
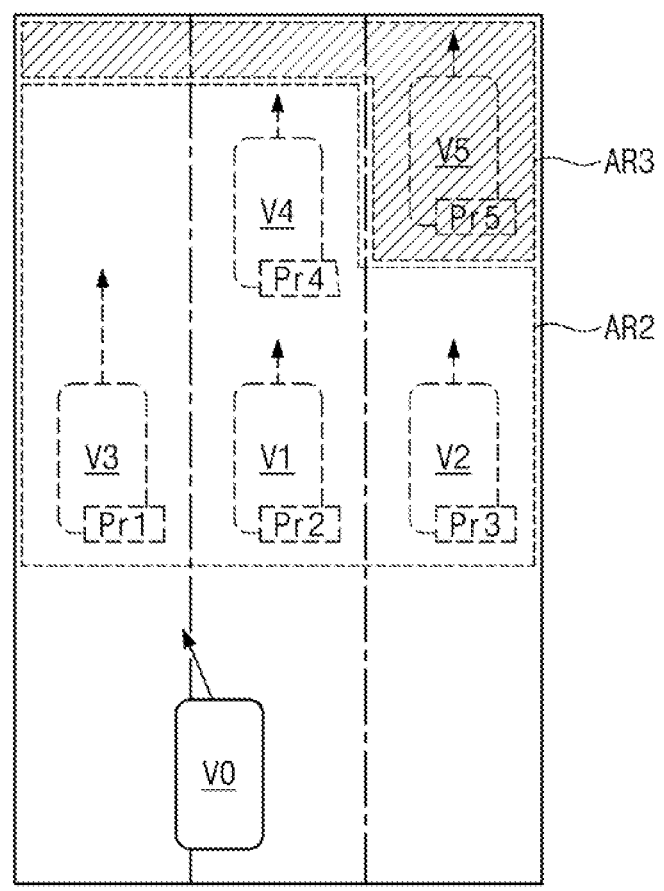

Referring to FIG. 12, there is no object belonging to the first area AR1. The first to fourth objects V1 to V4 belong to the second area AR2. The fifth object V5 belongs to the third area AR3. When the previous frame corresponds to FIG. 10, FIG. 12 may be a case where the calculation mode indicator Ki is −2. That is, the resource occupation state may be Full, and the frame complexity may be increased as compared with the previous frame. When the calculation mode indicator Ki is −2, the change of the calculation mode for two objects may proceed.

The object where the object frame information Oi is generated in the high calculation mode in the previous frame is only the third object V3. The mode control unit 180 changes the mode control signal Mi corresponding to the third object V3 to the low calculation mode control signal. The object recognition device 100, 220, or 320 extends the second area AR2 to include the third object V3. When all the recognized objects operate in the low calculation mode and the resource occupation state is Full, the object to which the priority information of a low ranking is assigned operates in the skip mode and does not perform calculation for object recognition.

Among the objects where the object frame information Oi is generated in the low calculation mode, the object to which the priority information of the lowest ranking is assigned is the fifth object V5. The mode control unit 180 changes the mode control signal Mi corresponding to the fifth object V5 to the skip mode control signal. That is, the object frame information generation unit 110 does not generate the object frame information Oi for the fifth object V5. The frame analysis unit 120 does not generate the object tracking information Ti for the fifth object V5. The object recognition device 100, 220, or 320 generates the third area AR3 that recognizes the object in the skip mode.

Figure 13:
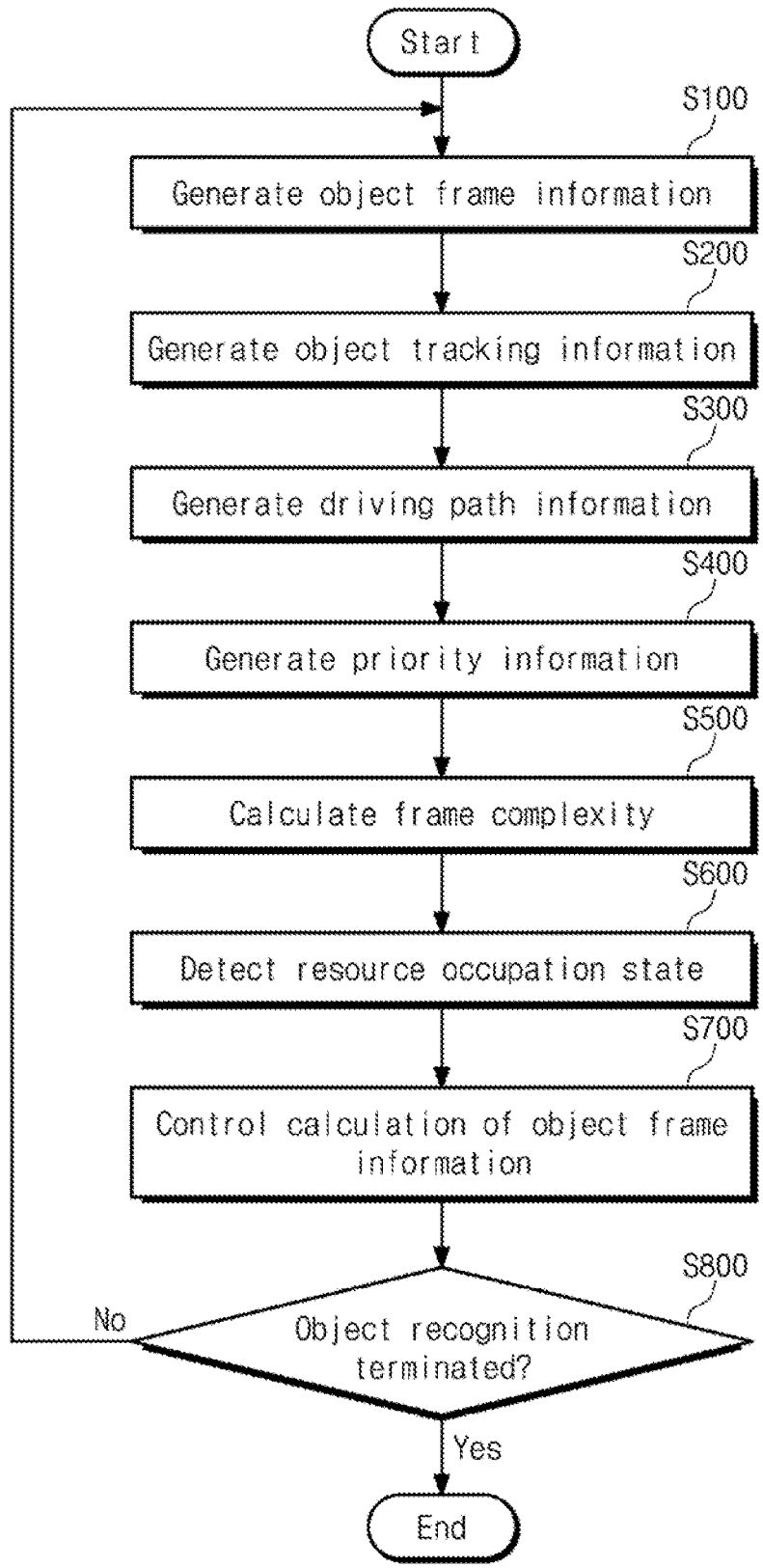
FIG. 13 is a flowchart of an object recognition method according to an embodiment of the inventive concept.

FIG. 13 is a flowchart of an object recognition method according to an embodiment of the inventive concept. The object recognition method of FIG. 13 is performed in the object recognition device 100 of FIG. 1, the object recognition device 220 of FIG. 3, or the object recognition device 320 of FIG. 4. For convenience of explanation, the object recognition method of FIG. 13 will be described later in detail, which is performed in the object recognition device 100 of FIG. 1.

In operation S100, the object recognition device 100 generates the object frame information Oi. Operation S100 may be performed in the object frame information generation unit 110. The object recognition device 100 receives the sensing information Si. The object recognition device 100 may recognize a plurality of objects based on the sensing information Si. The object recognition device 100 may generate the object frame information Oi corresponding to each of the plurality of objects. The object recognition device 100 may recognize a plurality of objects in a high calculation mode or a low calculation mode to generate the object frame information Oi.

In operation S200, the object recognition device 100 generates the object tracking information Ti. Operation S200 may be performed in the frame analysis unit 120. The object recognition device 100 calculates a prediction position or prediction speed of a plurality of objects for the next frame based on the object frame information Oi. The object recognition device 100 generates the object tracking information Ti based on a prediction position or a prediction speed of a plurality of calculated objects. In operation S300, the object recognition device 100 generates the driving path information Di. Operation S300 may be performed in the driving path analysis unit 130. The object recognition device 100 generates the driving path information Di for the next frame based on the object tracking information Ti.

In step S400, the object recognition device 100 generates the priority information Pri for the object. Operation S400 may be performed in the object priority calculator 140. The object recognition device 100 may calculate the possibility of collision between the object and the vehicle based on the object tracking information Ti and the driving path information Di. When the object recognition device 100 recognizes a plurality of objects, the object priority calculator 140 may generate the priority information Pri based on the possibility of collision between each object and the vehicle. An object having a high possibility of collision may be given the priority information of a high ranking, and an object having a low possibility of collision may be given the priority information of a low ranking.

In operation S500, the object recognition device 100 calculates a frame complexity. Operation S500 may be performed in the frame complexity calculator 150. The object recognition device 100 may generate the frame complexity based on the object tracking information Ti and the driving path information Di. For example, the object recognition device 100 may calculate the object complexity based on the object tracking information Ti. The object recognition device 100 may calculate the path complexity based on the driving path information Di. The object recognition device 100 may calculate the frame complexity by summing the object complexity and the path complexity. The object recognition device 100 may generate the frame complexity information FCi based on the frame complexity.

In operation S600, the object recognition device 100 detects a resource occupation state. Operation S600 may be performed in the resource detector 160. The object recognition device 100 senses the occupation rate of the processor 240 or the memory 250 of FIG. 3. The object recognition device 100 may generate the resource information Resi based on the occupation rate of the processor 240 or the memory 250.

In operation S700, the object recognition device 100 controls the calculation of the object frame information and changes the object recognition range. The calculation control of the object frame information may be performed in the mode control unit 180. The change of the object recognition range may be performed in the object frame information generation unit 110. The object recognition device 100 controls the amount of calculation for generating the object frame information Oi based on the priority information Pri, the frame complexity information FCi, and the resource information Resi. In order to control the calculation of the object frame information Oi in operation S700, the object recognition device 100 may generate the calculation mode indicator Ki. The calculation mode indicator Ki may be determined based on the frame complexity and the resource occupation state. The object recognition device 100 may increase or decrease the calculation amount of the object frame information generation unit 110 based on the calculation mode indicator Ki. The object recognition device 100 may increase or decrease the object recognition range of the object frame information generation unit 110 based on the calculation mode indicator Ki. The object recognition device 100 may increase or decrease the object recognition range recognized in the high calculation mode or the object recognition range recognized in the low calculation mode.

In operation S700, the calculation amount of the object frame information Oi may be determined differently for each object. For example, the object recognition device 100 may increase the calculation amount of the object having the priority information Pri of a high ranking. The object recognition device 100 may reduce the calculation amount of the object having the priority information Pri of a low ranking. The object recognition device 100 may operate in the high calculation mode, the low calculation mode, or the skip mode for each object. The object recognition device 100 may reduce the amount of calculation when the resource occupation state is the Full state. The object recognition device 100 may increase the amount of calculation when the resource occupation state is the Not Full state.

In operation S800, the object recognition device 100 may terminate object recognition or perform object recognition on the next frame. The object recognition device 100 may determine whether object recognition is terminated based on the control of the processor 240 of FIG. 3. When terminating the object recognition, the object recognition device 100 does not generate the object frame information Oi for the next frame. The object recognition device 100 may terminate the driving. When the object recognition is not terminated, the object recognition device 100 performs operation S100 again. That is, the object recognition device 100 generates the object frame information Oi for the next frame. In this case, the object recognition device 100 may repeat operations S100 to S700 for each frame until the object recognition is terminated.

Step S800 may be regarded as an operation of determining the termination of the autonomous driving of the autonomous driving system 200 or 300.

For example, when autonomous driving is terminated, the autonomous driving system 200 or 300 does not generate the object frame information Oi for the next frame. When autonomous driving is maintained, the autonomous driving system 200 or 300 performs operation S100 again. That is, the autonomous driving system 200 or 300 generates the object frame information Oi for the next frame. In this case, the object recognition device in the autonomous driving system may repeat operations S100 to S700 for each frame until the autonomous driving is terminated.

Figure 14:
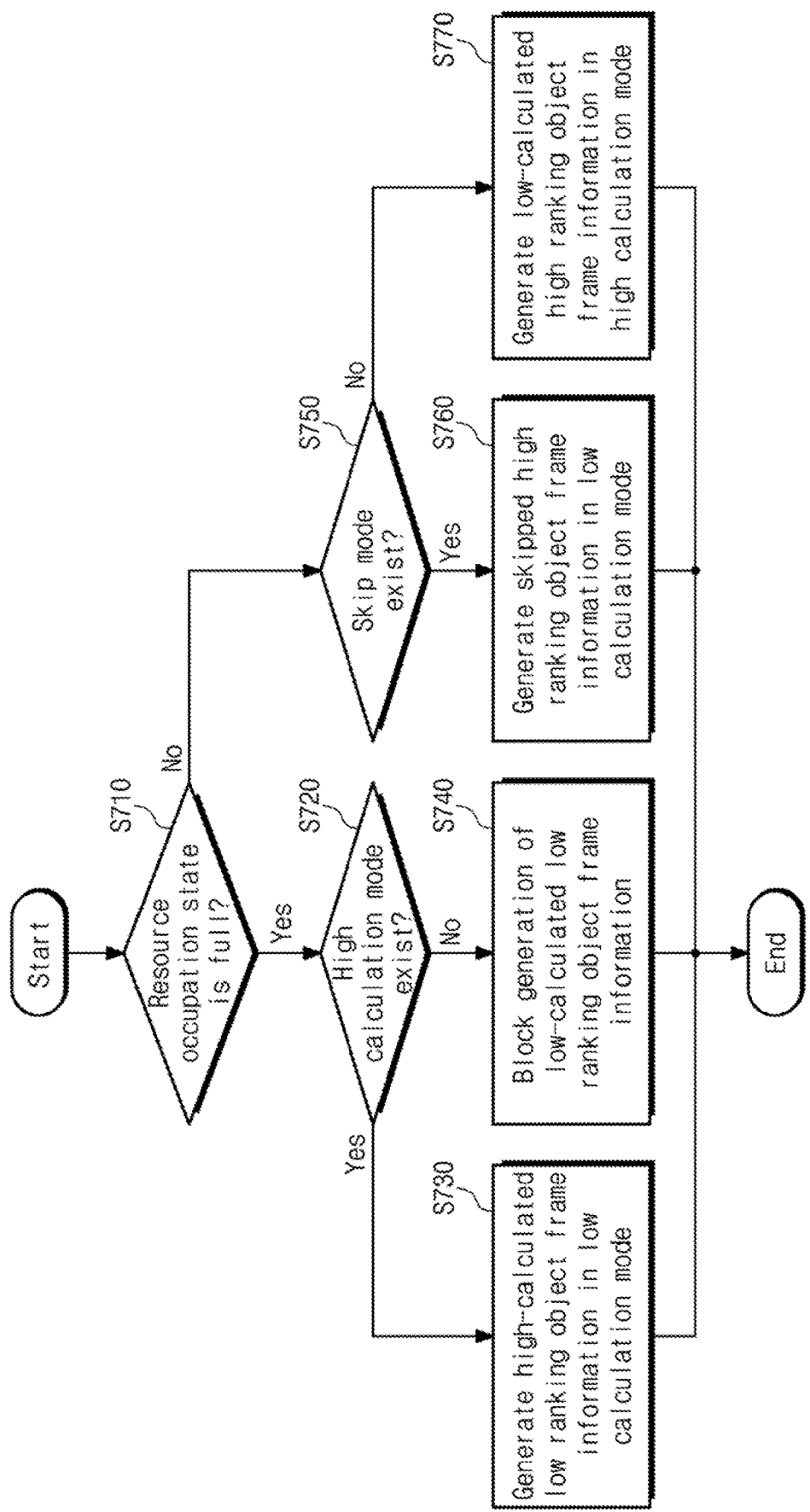
FIG. 14 is a flowchart of a method of controlling calculation of object frame information according to an embodiment of the inventive concept.

FIG. 14 is a flowchart of a method of controlling the calculation of object frame information according to an embodiment of the inventive concept. FIG. 14 is a flowchart embodying operation S700 in FIG. 13. Referring to FIG. 14, the method for controlling the calculation of object frame information may be performed in the mode control unit 180 of FIG. 1. In addition, the calculation mode indicator calculator 170 of FIG. 1 may be used to control the calculation of the object frame information.

In operation S710, the object recognition device 100 determines whether the resource occupation state is the Full state. When the resource occupation state is the Full state, since the processor or the memory is in an overload state, the object recognition device 100 determines that it is difficult to maintain the calculation amount for generating the object frame information Oi in the previous frame. That is, when the resource occupation state is the Full state, the object recognition device 100 controls the object frame information generation unit 110 to reduce the amount of calculation. When the resource occupation state is not the Full state, the object recognition device 100 controls the object frame information generation unit 110 to increase the amount of calculation. The resource occupation state may be determined based on the calculation mode indicator Ki. For example, when the calculation mode indicator Ki is a negative number, the resource occupation state may be recognized as a Full state. When the resource occupation state is the Full state, operation S720 is performed. When the resource occupation state is not the Full state, operation S750 is performed.

In operation S720, the object recognition device 100 determines whether object frame information generated in the high calculation mode in the previous frame exists. When object frame information generated in the high calculation mode exists, operation S730 for changing the high calculation mode to the low calculation mode is performed. When object frame information generated in the high calculation mode does not exist, operation S740 for changing the low calculation mode to the skip mode is performed.

In operation S730, the object recognition device 100 performs a control to generate, in the low calculation mode, the object frame information having the priority information of a low ranking among the object frame information generated in the high calculation mode in the previous frame. The object recognition device 100 may determine the number of object frame information to be generated in the low calculation mode based on the frame complexity. For example, when the frame complexity increases, the number of object frame information changed to the low calculation mode may be larger than the number of object frame information changed to the low calculation mode when the frame complexity decreases.

In operation S740, the object recognition device 100 blocks the generation of the object frame information having the priority information of a low ranking among the object frame information generated in the low calculation mode in the previous frame. The object recognition device 100 may determine the number of object frame information that is not generated based on the frame complexity. For example, when the frame complexity increases, the number of object frame information changed to the skip mode may be larger than the number of object frame information changed to the skip mode when the frame complexity decreases.

In operation S750, the object recognition device 100 determines whether object frame information that operates in the skip mode in the previous frame and is not generated exists. When object frame information whose generation is blocked exists, operation S760 for changing the skip mode to the low calculation mode is performed. When object frame information whose generation is blocked does not exist, operation S770 for changing the low calculation mode to the high calculation mode is performed.

In operation S760, the object recognition device 100 performs a control to generate, in the low calculation mode, the object frame information having the priority information of a high ranking among the object frame information whose generation is blocked in the previous frame. The object recognition device 100 may determine the number of object frame information to be generated in the low calculation mode based on the frame complexity. For example, when the frame complexity increases, the number of object frame information changed to the low calculation mode may be less than the number of object frame information changed to the low calculation mode when the frame complexity decreases.

In operation S770, the object recognition device 100 performs a control to generate, in the high calculation mode, the object frame information having the priority information of a high ranking among the object frame information generated in the low calculation mode in the previous frame. The object recognition device 100 may determine the number of object frame information to be generated in the high calculation mode based on the frame complexity. For example, when the frame complexity increases, the number of object frame information changed to the high calculation mode may be less than the number of object frame information changed to the high calculation mode when the frame complexity decreases.

According to embodiments of the inventive concept, an object recognition device, an autonomous driving system including the same, and an object recognition method using the autonomous driving system may adaptively adjust the calculation required for signal processing according to a resource state and a peripheral state, thereby preventing the halt or errors of a system, and improving the signal processing speed.

Although the exemplary embodiments of the inventive concept have been described, it is understood that the inventive concept should not be limited to these exemplary embodiments but various changes and modifications can be made by one ordinary skilled in the art within the spirit and scope of the inventive concept as hereinafter claimed.

What is claimed is:

1. An object recognition device comprising:
   an object frame information generation unit configured to recognize one or more objects in a high calculation mode or a low calculation mode having a lower calculation amount than the high calculation mode based on a mode control signal and generate object frame information for the one or more objects;
   a frame analysis unit configured to receive the object frame information and generate object tracking information by calculating a prediction position or a prediction speed of each of the one or more objects for a next frame;
   an object priority calculator configured to receive the object tracking information and generate priority information for the one or more objects based on a collision possibility with the one or more objects;
   a frame complexity calculator configured to receive the object tracking information and calculate a frame complexity based on the number and distribution of the one or more objects; and
   a mode control unit configured to generate the mode control signal for adjusting an object recognition range and a calculation amount of the object frame information generation unit based on the priority information, the frame complexity, and a resource occupation state, the object recognition range being adjusted as in one of the high calculation mode, the low calculation mode, and a skip mode.

2. The object recognition device of claim 1, further comprising a driving path analysis unit configured to generate driving path information for the next frame based on the object tracking information.

3. The object recognition device of claim 2, wherein the object priority calculator calculates the collision possibility between the one or more objects and the object recognition device based on the object tracking information and the driving path information and generates the priority information for the one or more objects based on the collision possibility.

4. The object recognition device of claim 2, wherein the frame complexity calculator calculates an object complexity based on the object tracking information, calculates a path complexity based on the driving path information, and calculates the frame complexity based on the object complexity and the path complexity.

5. The object recognition device of claim 1, further comprising a calculation mode indicator calculator configured to generate a calculation mode indicator based on the frame complexity and the resource occupation state, and provide the calculation mode indicator to the mode control unit.

6. The object recognition device of claim 5, wherein the mode control unit provides a high calculation mode control signal for operating in the high calculation mode, a low calculation mode control signal for operating in the low calculation mode, or a skip mode control signal for operating in the skip mode to the object frame information generation unit based on the calculation mode indicator.

7. The object recognition device of claim 6, wherein
the calculation mode indicator calculator determines an absolute value of the calculation mode indicator based on the frame complexity, and determines a polarity of the calculation mode indicator based on the resource occupation state; and
the object frame information generation unit changes a calculation mode of each of the one or more objects based on the polarity of the calculation mode indicator and determines the number of objects, which change the calculation mode, based on the absolute value of the calculation mode indicator.

8. The object recognition device of claim 6, wherein the object frame information generation unit comprises:
an object calculation controller configured to generate an object calculation control signal based on the mode control signal; and
an object calculator configured to generate the object frame information for the one or more objects based on the object calculation control signal and sensing information generated by sensing a periphery.

9. The object recognition device of claim 8, wherein the object calculator comprises:
a feature extraction high calculator configured to process input information in the high calculation mode, the input information being generated based on the sensing information;
a feature extraction low calculator configured to process the input information in the low calculation mode and have a lower calculation amount than the feature extraction high calculator; and
a multiplexer configured to provide the input information to one of the feature extraction high calculator and the feature extraction low calculator or block the providing of the input information to the feature extraction high calculator and the feature extraction low calculator, based on the object calculation control signal.

10. The object recognition device of claim 1, further comprising a resource detector configured to detect the resource occupation state.

11. An autonomous driving system comprising:
a sensor unit configured to sense a periphery to generate sensing information;
an object recognition device configured to receive the sensing information, recognize one or more objects to generate object frame information, and generate driving path information based on the object frame information;
a vehicle control device configured to control a steering angle and a speed of a vehicle based on the driving path information;
a processor configured to control the sensor unit, the object recognition device, and the vehicle control device; and
a memory configured to store the sensing information, the object frame information, and the driving path information,
wherein an object recognition device configured to:
generate the object frame information by recognizing the one or more objects in a high calculation mode or a low calculation mode having a lower calculation amount than the high calculation mode;
calculate a frame complexity based on the object frame information;
detect a resource occupation state of the memory or the processor; and
change an object recognition range recognized as in one of the high calculation mode, the low calculation mode, and a skip mode based on the resource occupation state and the frame complexity.

12. The autonomous driving system of claim 11, wherein the object recognition device is further configured to generate object tracking information by calculating a prediction position or a prediction speed of each of the one or more objects for a next frame.

13. The autonomous driving system of claim 12, wherein the object recognition device generates the driving path information of the vehicle for the next frame based on the object tracking information and provide the driving path information to the vehicle control device.

14. The autonomous driving system of claim 13, wherein the object recognition device is further configured to receive the object tracking information and the driving path information to calculate a collision probability between the one or more objects and the vehicle, and generate priority information based on the collision probability.

15. The autonomous driving system of claim 14, wherein the object recognition device generates a mode control signal for determining the object recognition range and a calculation amount of each of the one or more objects based on the priority information, the frame complexity, and the resource occupation state, and
operates in one of the high calculation mode, the low calculation mode having a lower calculation amount than the high calculation mode, and the skip mode, based on the mode control signal.

16. An object recognition method comprising:
generating, by an object recognition device, object frame information by recognizing a plurality of objects in a high calculation mode or a low calculation mode having a lower calculation amount than the high calculation mode;
generating, by the object recognition device, priority information on the plurality of objects based on a possibility of collision with the plurality of recognized objects;
calculating, by the object recognition device, a frame complexity based on the object frame information;
detecting, by the object recognition device, a resource occupation state of a memory or a processor; and
changing, by the object recognition device, an object recognition range recognized as in the high calculation mode or an object recognition range recognized as in the low calculation mode based on the priority information, the resource occupation state, and the frame complexity.

17. The method of claim 16, wherein the changing of the object recognition range comprises, when the resource occupation state is a full state, recognizing, as in the low calculation mode, an object having the priority information of the lowest ranking among objects where object frame information is generated in the high calculation mode in a previous frame, and adjusting the number of object frame information generated in the low calculation mode based on the frame complexity.

18. The method of claim 16, wherein the changing of the object recognition range comprises, when the resource occupation state is a full state and object frame information of all the plurality of objects is generated in the low calculation mode in a previous frame, blocking the generation of object frame information having the priority information of the lowest ranking and adjusting the number of blocking generations of object frame information based on the frame complexity.

19. The method of claim 16, wherein the changing of the object recognition range comprises, when the resource occupation state is a not full state, generating, in the low calculation mode, object frame information having the priority information of the highest ranking among objects where the generation of object frame information is blocked in a skip mode in a previous frame, and adjusting the number of object frame information generated in the low calculation mode based on the frame complexity.

20. The method of claim 16, wherein the changing of the object recognition range comprises, when the resource occupation state is a not full state, generating, in the high calculation mode, object frame information having the priority information of the highest ranking among objects where object frame information is generated in the low calculation mode in a previous frame, and adjusting the number of object frame information generated in the high calculation mode based on the frame complexity.

* * * * *